(No Model.) 2 Sheets—Sheet 1.
G. W. BROWN.
APPARATUS FOR STOPPING ENGINES.
No. 563,011. Patented June 30, 1896.
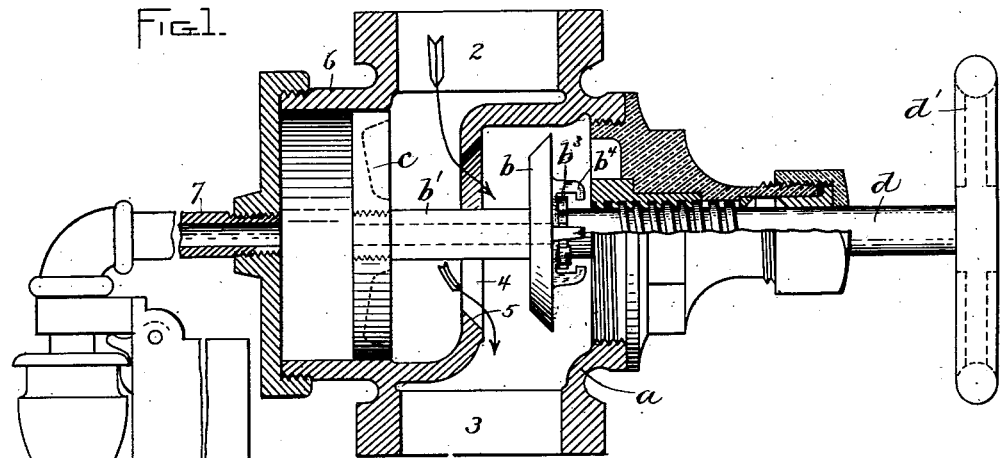
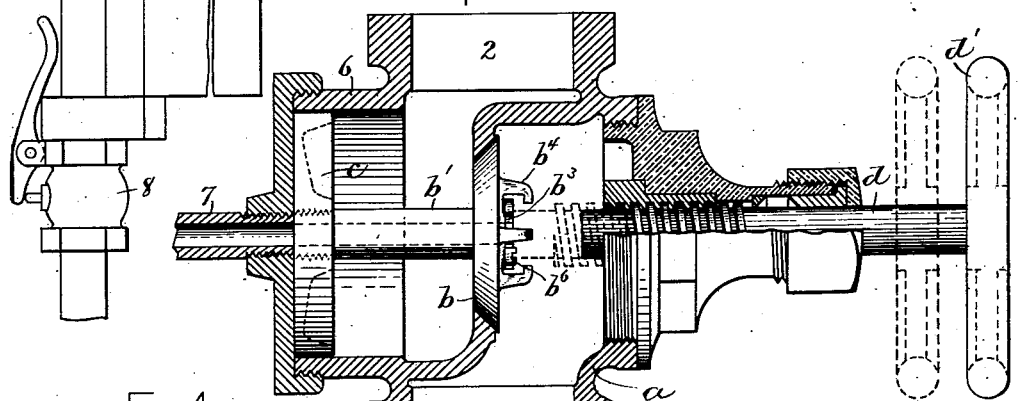
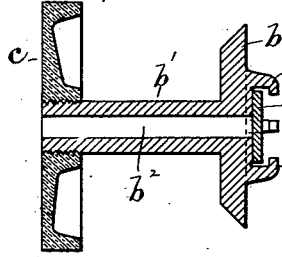
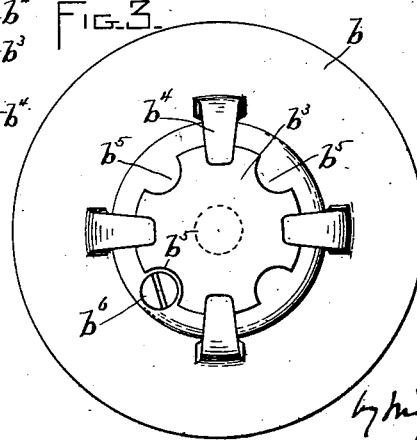
WITNESSES: INVENTOR:

(No Model.) 2 Sheets—Sheet 2.
G. W. BROWN.
APPARATUS FOR STOPPING ENGINES.
No. 563,011. Patented June 30, 1896.
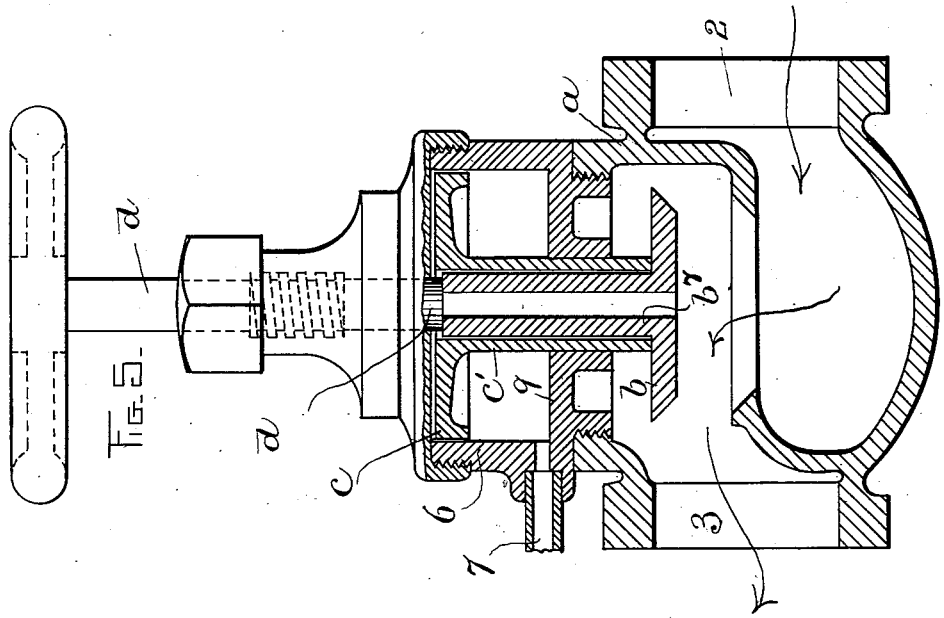
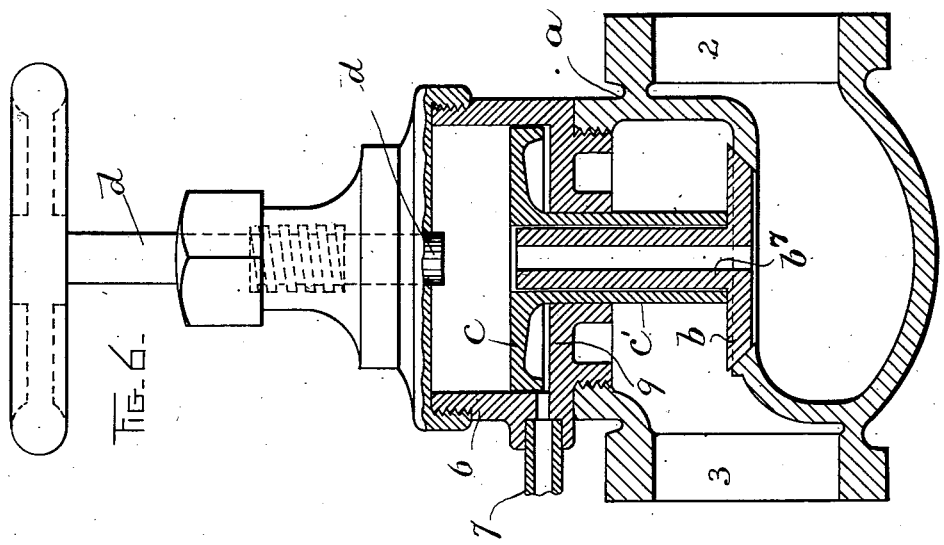
Witnesses:
A. D. Harrison
A. D. Adams
Inventor:
Gilman W. Brown
by Wright Brown & Quimby
Attys.

UNITED STATES PATENT OFFICE.

GILMAN W. BROWN, OF WEST NEWBURY, MASSACHUSETTS.

APPARATUS FOR STOPPING ENGINES.

SPECIFICATION forming part of Letters Patent No. 563,011, dated June 30, 1896.

Application filed March 31, 1896. Serial No. 585,557. (No model.)

*To all whom it may concern:*

Be it known that I, GILMAN W. BROWN, of West Newbury, in the county of Essex and State of Massachusetts, have invented certain new and useful Improvements in Apparatus for Stopping Engines, of which the following is a specification.

This invention relates to apparatus for shutting off steam from a steam-engine, and particularly to an emergency shut-off of the character shown in Letters Patent of the United States No. 544,085, granted to me August 6, 1895. In said patent a shut-off valve is shown adapted to close a steam pipe or conduit, and connected with a piston of larger area than the valve, said piston being located in a cylinder connected with the conduit. The steam enters the cylinder around the piston, and balances the latter when there is no steam-outlet from the cylinder, but when an outlet is formed by the opening of a vent with which the cylinder is provided the piston is unbalanced and forced into the cylinder by the steam-pressure, which is thus caused to close the shut-off valve and hold it closed so long as the steam-outlet of the cylinder remains open. The vent-valve is opened by automatic mechanism when the speed of the engine becomes excessive, or under other conditions requiring a quick closure of the shut-off valve.

My invention has for its object to enable an emergency-valve or shut-off of the character above described to be operated by an attendant, so that the same valve can be used not only as an automatically-operated emergency shut-off, but also in the same manner as an ordinary screw-valve, to shut off the steam at the will of the operator.

The invention also has for its object to prevent the steam-pressure in the conduit from balancing the piston and thus prematurely opening the shut-off valve.

The invention consists in an appliance of the character specified, comprising a casing or conduit having a valve-seat, a shut-off valve in the conduit, and two independent agencies for operating said valve, one controlled by steam-pressure and the other by hand, each being capable of operation independently of the other.

The invention also consists in certain improvements incidental to the main objects of my invention, all of which I will now proceed to describe and claim.

Of the accompanying drawings, forming a part of this specification, Figure 1 represents a sectional view of a shut-off valve and its casing provided with my improvements, the valve being shown in its normal condition ready to be closed by steam-pressure. Fig. 2 represents a similar view showing the shut-off valve closed. Fig. 3 represents an end view of the shut-off valve, showing the preferred means for securing the relief-valve thereto. Fig. 4 represents a sectional view of the valve and piston. Figs. 5 and 6 represent sectional views of a modification.

The same letters and numerals of reference indicate the same parts in all the figures.

Referring to Figs. 1 to 4, inclusive, $a$ represents a casing comprising an inlet portion 2 and outlet portion 3, said portions being adapted to be coupled to sections of a steam-conduit. Between the portions 2 3 is a partition having a steam-port 4, the margin of which constitutes a valve-seat 5.

$b$ represents a shut-off valve, which is movable in the casing and is adapted to open and close the port. The shut-off valve has a stem or rod $b'$, to one end of which is affixed a piston $c$, movable in a cylinder 6, which is formed on the casing $a$ and communicates with the inlet portion 2 thereof, the piston fitting the cylinder somewhat loosely, so that steam can leak around the piston into the outer portion of the cylinder and thus normally balance the piston when there is no outlet for the steam from the cylinder behind the piston.

The cylinder is provided with a vent or pressure outlet, (shown as a tube 7,) which is provided with a valve 8, whereby it may be opened and closed. When the vent is closed, pressure accumulates in the outer portion of the cylinder, and the piston is balanced, so that the steam-pressure on the under side of the valve $b$ opens the latter. I term the face of the valve which faces the supply end 2 of the casing the "under" side, and the other face the "upper" side.

When the vent is opened, the pressure is relieved at the outer side of the piston, and the latter is unbalanced and forced outwardly by the pressure in the casing and is thus caused to close the shut-off valve, the piston $c$ being larger in area than the valve $b$. It will be seen, therefore, that the opening of the vent-valve causes the closing of the shut-off valve. The vent-valve may be opened either automatically or through human agency, as described in my former patent above mentioned.

To prevent the accumulation of pressure in the outer portion of the cylinder 6 and the consequent opening of the shut-off valve by the steam-pressure, a result that would follow the closing of the vent-valve before the hand-operated device hereinafter referred to is adjusted to hold the valve $b$ in its closed position, I provide means for relieving any pressure that may accumulate in the outer portion of the cylinder, so that the steam-pressure in the conduit will hold the valve closed. In the embodiment of my invention now being considered I show the valve-stem $b'$, provided with a relief-passage $b^2$, extending through the piston and through the shut-off valve, and a relief-valve $b^3$, arranged to close upon a seat surrounding said passage at the upper side of the shut-off valve, the arrangement of said relief passage and valve being such that the relief-valve will be opened by any increase of pressure in the outer portion of the cylinder, thus preventing the piston from being unbalanced by an accumulation of pressure in the outer portion of the cylinder. Said relief-valve also prevents the passage of steam through the relief-passage $b^2$ into the outer end of the cylinder 6 when the pressure on the upper side of the valve $b$ is greater than that on the outer side of the piston. The relief-valve $b^3$ is here shown as a flat disk held in operative relation to its seat by means of ears or lugs $b^4$, formed on the shut-off valve $b$, said ears permitting the necessary play of the relief-valve, but preventing it from being displaced.

The relief-valve is preferably provided with recesses $b^5$, corresponding with the ears $b^4$, and arranged so that the valve can be inserted in the space between the ears when the recesses coincide with the ears, the valve being afterward partly rotated to bring the recesses out of line with the ears, as shown in Fig. 3. A screw $b^6$ is then inserted in the shut-off valve $b$ in position to engage one of the recesses $b^5$ and prevent the relief-valve from being turned to bring its recesses into line with the ears $b^4$. So long as the vent-valve 8 remains open and there is no pressure in the outer portion of the cylinder, the relief-valve is held to its seat by the pressure in the casing $a$, said valve yielding only when pressure accumulates in the outer portion of the cylinder.

$d$ represents a hand-operated device whereby the engineer may close the shut-off valve $b$ independently of the pressure-controlled means above described. Said device in its simplest form is a rod or stem having a screw-thread engaged with an internal thread in the casing $a$ and provided at its outer end with a suitable handle $d'$. The rod $d$ is arranged so that its inner end projects into the casing in position to bear upon the relief-valve $b^3$ when the shut-off valve $b$ is opened, as shown in Fig. 1. The rod $d$ has no positive connection with the shut-off valve, and therefore permits the latter to be closed by the steam-pressure, the shut-off valve leaving the rod when thus closed, as indicated in Fig. 2. Hence the rod $d$ does not interfere with the steam-pressure control of the shut-off valve. When, however, the engineer desires to shut off the steam in the usual manner, he rotates the rod $d$ in the direction required to force it into the casing, thus causing it to close the shut-off valve, as indicated by dotted lines in Fig. 2, the rod $d$ also holding the relief-valve to its seat when the shut-off valve is thus closed.

When the rod $d$ is moved outwardly from its valve-closing position, the cylinder-vent being closed, the steam-pressure leaking around the piston allows pressure to accumulate on the outer side of the piston $c$, thus balancing the piston and allowing the pressure on the under side of the valve $b$ to open the valve.

It will be seen that the apparatus above described constitutes at once an emergency and a hand-operated stop or shut-off, its operation as a hand-operated shut-off being the same as that of any ordinary shut-off valve, so far as the closing movement is concerned, while its opening movement is caused by steam-pressure, the two operations being independent of each other, that is to say, the valve can be closed by steam-pressure without movement of the rod $d$, or by the rod $d$ without the agency of steam-pressure. I do not limit myself to the construction above set forth, as the object of my invention may be attained by various other mechanical contrivances.

In Figs. 5 and 6 I show a construction in which the valve $b$ and piston $c$ are not positively connected with each other, and are movable independently, the piston having a tube $c'$, which slides and fits closely in a head 9 at the inner end of the cylinder 6. The valve $b$ has a tubular stem $b^7$, fitted loosely in the tube $c'$. When the valve $b$ is open, as in Fig. 5, and the vent-tube 7 closed, the piston $c$ is balanced by the steam leaking through the tube $c'$ and around the piston, the valve $b$ being therefore held open by the steam-pressure in the conduit. When the vent-tube 7 is opened, the piston is unbalanced and is forced inwardly, or toward the valve-seat, by the steam-pressure, its tube $c'$ bearing on the valve $b$ and forcing the latter to its seat, where it is held by the steam-pressure so long as the vent-tube remains closed. (See Fig. 6.) The valve-closing rod $d$ is arranged to bear on the end of the stem $b^7$, and may be adjusted to close the valve while the piston is in the position shown in Fig. 5 without moving the piston, the valve and its stem being movable independently of the piston.

I claim—

1. An appliance of the character specified, comprising a casing or conduit having a valve-seat, a shut-off valve in the conduit, and two independent agencies for operating said valve, one controlled by steam-pressure and the other by hand, each being capable of operation independently of the other.

2. An appliance of the character specified, comprising a casing or conduit, a shut-off valve therein, means substantially as described for causing the steam-pressure to either close or open the shut-off valve, and a hand-operated valve-closing device operatively engaged with the casing and separable from the valve.

3. An appliance of the character specified, comprising a casing or conduit having a valve-seat and a cylinder communicating with the conduit at one side of the valve-seat, said cylinder having a vent, a shut-off valve in the conduit, a piston movable in the cylinder and connected with the shut-off valve, and a relief-valve adapted to prevent an accumulation of pressure in the cylinder.

4. An appliance of the character specified, comprising a casing or conduit having a valve-seat, a cylinder communicating with the conduit at one side of the valve-seat and having a vent, a shut-off valve movable in the casing to open and close the valve-seat, a piston movable in the cylinder and connected with the shut-off valve, a relief-passage extending through the piston and shut-off valve, a relief-valve controlling said passage and adapted to yield to prevent an accumulation of pressure in the cylinder, and a hand-operated valve-closing device having an operative engagement, such as a screw-threaded connection, with the casing and arranged to bear loosely on and close the relief-valve and the shut-off valve.

In testimony whereof I have signed my name to this specification, in the presence of two subscribing witnesses, this 24th day of March, A. D. 1895.

GILMAN W. BROWN.

Witnesses:
A. D. HARRISON,
A. D. ADAMS.